April 5, 1927.  
F. ZACHER  
1,623,569  
APPARATUS FOR SUPPLYING ELECTRIC CURRENT TO VACUUM TUBES  
Filed June 16, 1925
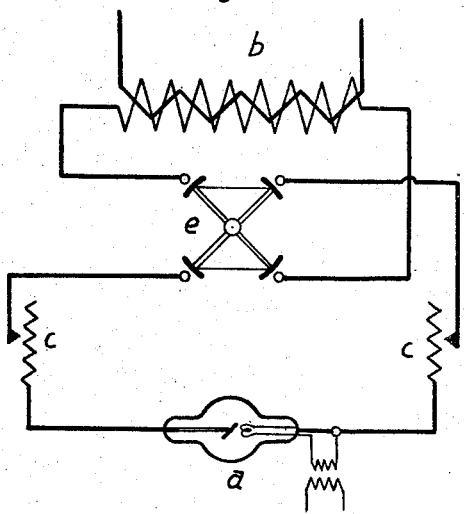
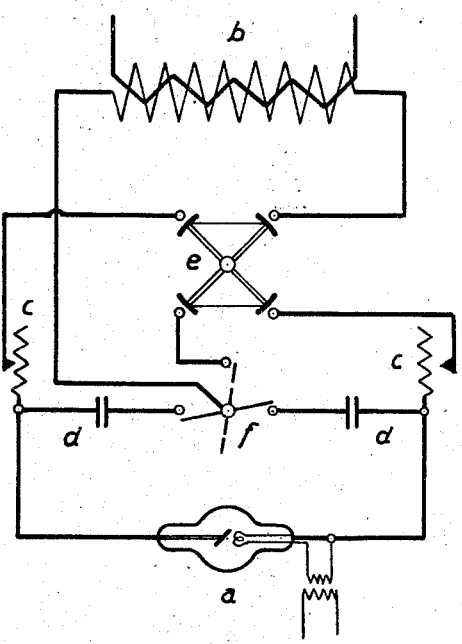
INVENTOR:  
Franz Zacher  
By Richards & Geier  
Attys.

Patented Apr. 5, 1927.

1,623,569

UNITED STATES PATENT OFFICE.

FRANZ ZACHER, OF ERLANGEN, GERMANY, ASSIGNOR TO THE FIRM REINIGER, GEBBERT & SCHALL AKTIENGESELLSCHAFT, OF BAVARIA, GERMANY.

APPARATUS FOR SUPPLYING ELECTRIC CURRENT TO VACUUM TUBES.

Application filed June 16, 1925, Serial No. 37,579, and in Germany June 17, 1924.

This invention relates to improvements in apparatus for supplying vacuum tubes with electric current from an alternating current source.

It is usual to supply vacuum tubes with an E. M. F. of constant direction obtained from a source of alternating current by the aid of condensers and rotating switch devices; and such apparatus may be designed to supply an E. M. F. constant, not merely in direction but also, within narrow limits, in magnitude. The present invention relates to apparatus by which a Röntgen or other vacuum tube may be supplied either with the substantially constant E. M. F. derived from such a system of condensers or at will with a merely rectified E. M. F.

A construction according to the invention is illustrated diagrammatically in the accompanying drawings in which Fig. 1 is a diagrammatic view of a circuit embodying one form of the invention; and Fig. 2 is a similar view of another form.

In these drawings the vacuum tube is indicated as a Röntgen tube $a$, and the source of alternating current as a transformer $b$. The secondary of the transformer is connected with the Röntgen tube, if desired over considerable resistances $c$, through a rotating switch device. In the figure this switch device is a rotating rectifier $e$.

If it is desired to equalize the supply by means of condensers, or groups of condensers, $d$ as indicated in Figure 2 the rectifier $e$ is connected on one side only directly to the source of supply, the other terminal of the source of supply being connected with the condenser system. If it is not desired to use the condensers the connections may be as in Figure 1.

To enable either system of connections to be established at will a change-over switch $f$ is provided. When closed in the full line position it connects one terminal of the transformer secondary to the condensers or condenser groups, while the rectifier $e$ connects the other terminal of the transformer secondary alternately to each of the condensers. If the switch $f$ is thrown over to the position indicated in dotted lines the connections in Figure 1 are established and the condensers $d$ are cut out of circuit. Two of the terminals of the rectifier $e$ are then connected with the secondary of the transformer $b$ and the other two terminals with the terminals of the Röntgen tube. The device $e$ then operates as a rectifier and supplies the tube with merely rectified current.

What is claimed is:

In a system for the operation of vacuum tubes, and particularly Röntgen tubes, a source of alternating current including a secondary winding, a rotary high tension rectifier having certain terminals connected to the poles of said winding, a vacuum tube, two or more condensers in parallel with the terminals of said tube and capable of being connected thereto and disconnected therefrom, and a switch in the circuit between one of the poles of said winding and one of the terminals of said rectifier and operable to alternately disconnect the rectifier from said pole and connect the latter in parallel to the terminals of said tube through said condensers.

In testimony whereof I have affixed my signature.

FRANZ ZACHER.